United States Patent [19]
Okada et al.

[11] Patent Number: 5,153,777
[45] Date of Patent: Oct. 6, 1992

[54] COMPACT-SIZE ZOOM LENS SYSTEM

[75] Inventors: Takashi Okada; Akira Fukushima, both of Osaka; Hiromu Umeda, Sakai; Hisashi Tokumaru, Osakasayama; Junji Hashimura, Sakai; Hisayuki Masumoto, Sakai, all of Japan

[73] Assignee: Minolta Camera Co., Ltd., Osaka, Japan

[21] Appl. No.: 622,715

[22] Filed: Dec. 5, 1990

[30] Foreign Application Priority Data

Dec. 5, 1989 [JP] Japan .................................. 1-317111

[51] Int. Cl.⁵ .................. G02B 15/14; G02B 13/18
[52] U.S. Cl. .................... 359/692; 359/716; 359/739
[58] Field of Search .............. 350/427, 432, 449; 359/738, 739, 691, 692, 716

[56] References Cited

U.S. PATENT DOCUMENTS 4,705,363 11/1987 Ikemori .......................... 350/423
4,838,667 6/1989 Ueda ............................... 350/449
4,936,661 6/1990 Betensky et al. ................ 359/692

Primary Examiner—Scott J. Sugarman
Attorney, Agent, or Firm—Price, Gess & Ubell

[57] ABSTRACT

A compact-size, light-weight, low-cost zoom lens system with high optical quality is achieved by using a ray restrictor placed at the most object side of the zoom lens system. In one type, the ray resistor shifts toward the object at a speed different from that of the most object side lens of the zoom lens system as the zoom lens system is zoomed toward the longest focal length, which effectively blocks harmful rays causing coma flare in the peripheral area. In another type, the aperture diameter of the ray restrictor varies according to a zooming operation. The ray restrictor of any type is especially effective when used in a zoom lens system composed of two lens groups. By introducing one or more aspherical surfaces satisfying a certain condition (or conditions) in the zoom lens system, various aberrations are further favorably corrected.

27 Claims, 14 Drawing Sheets

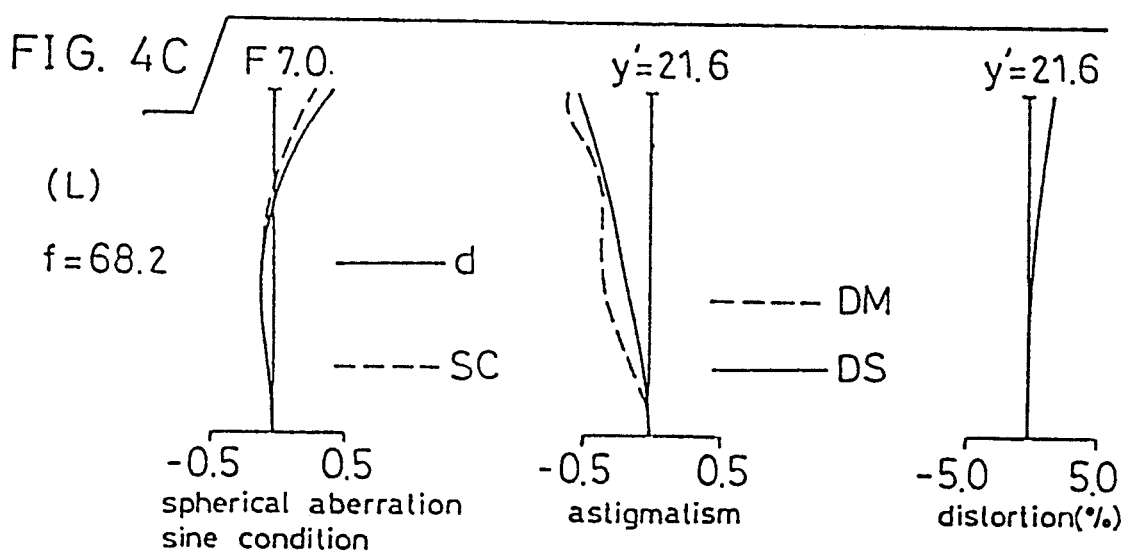

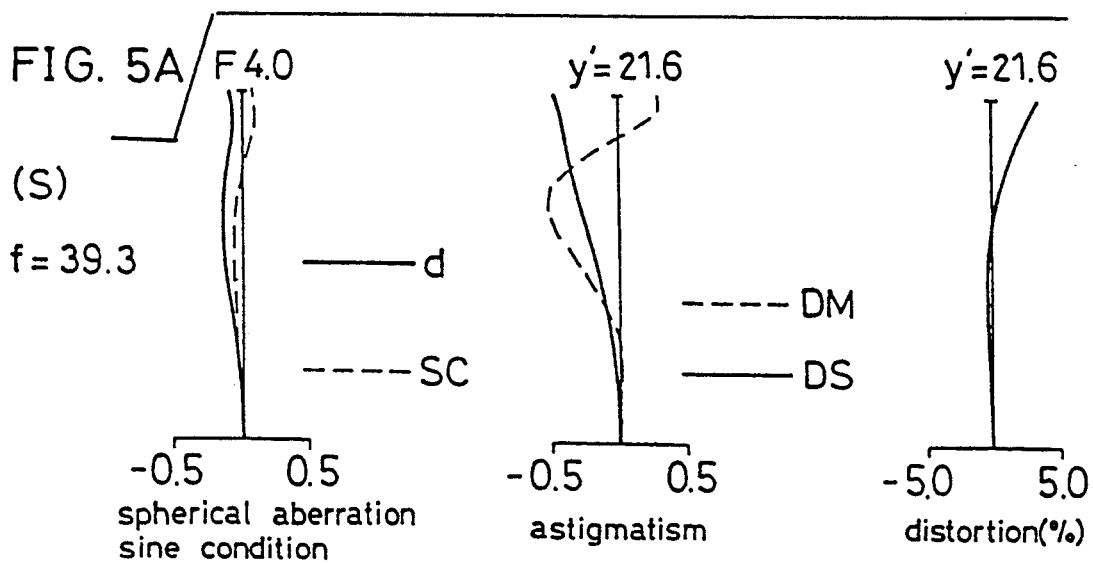
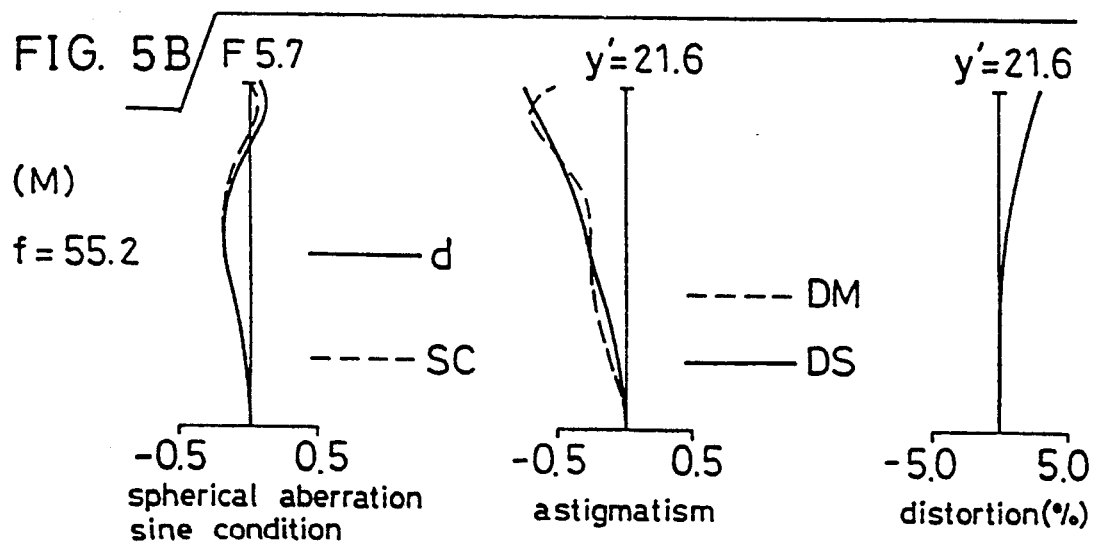

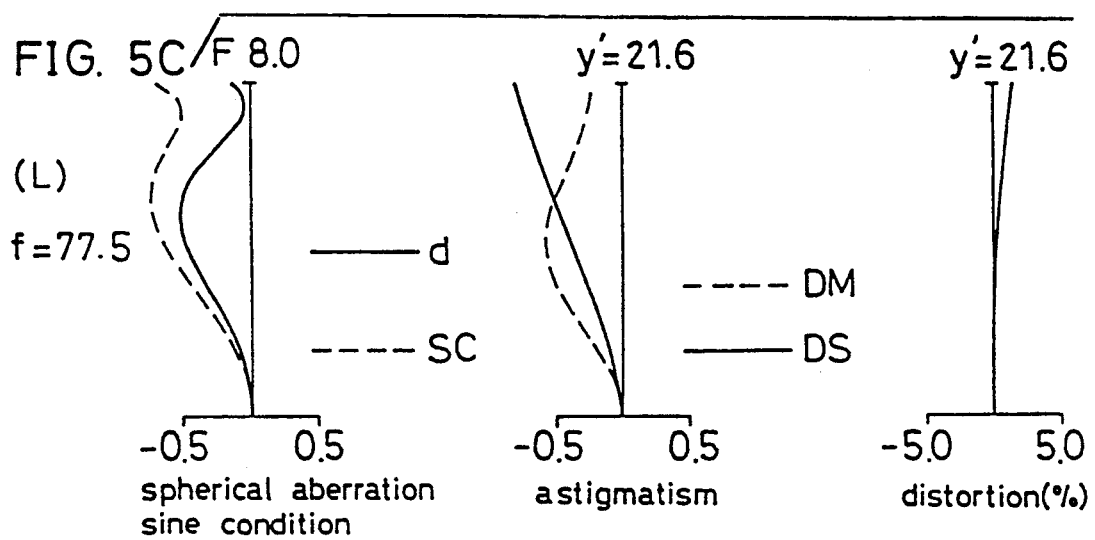

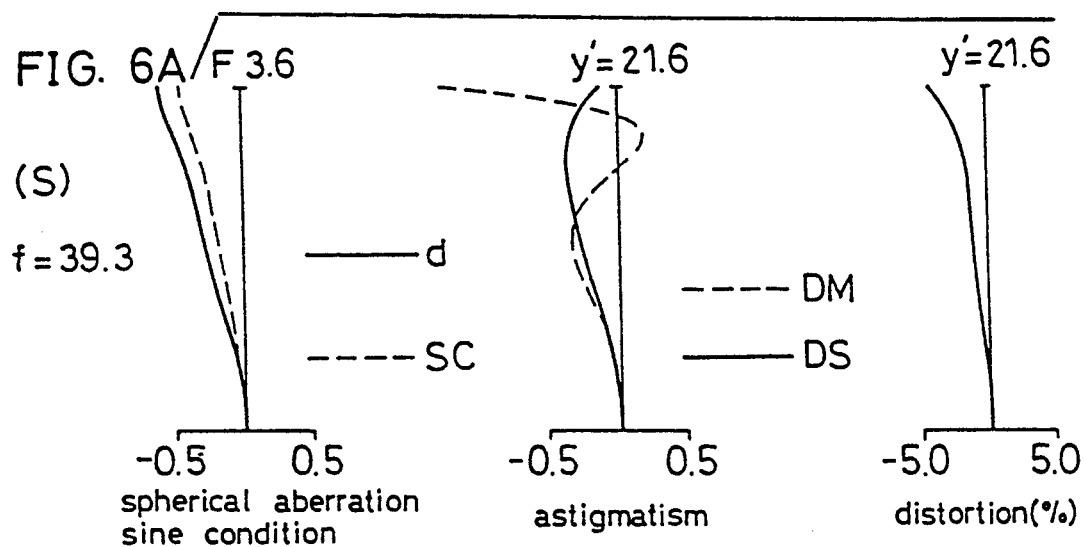
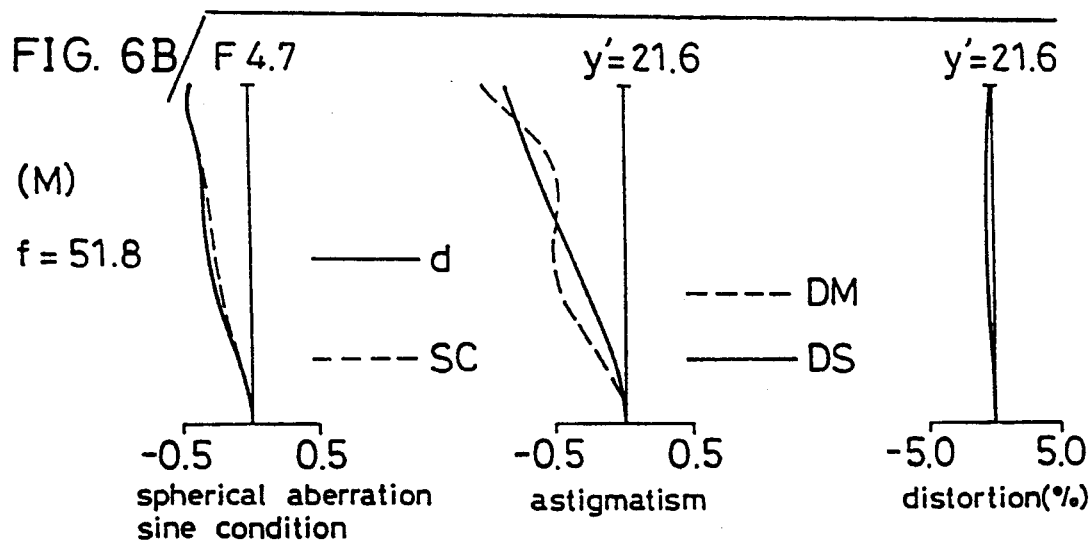

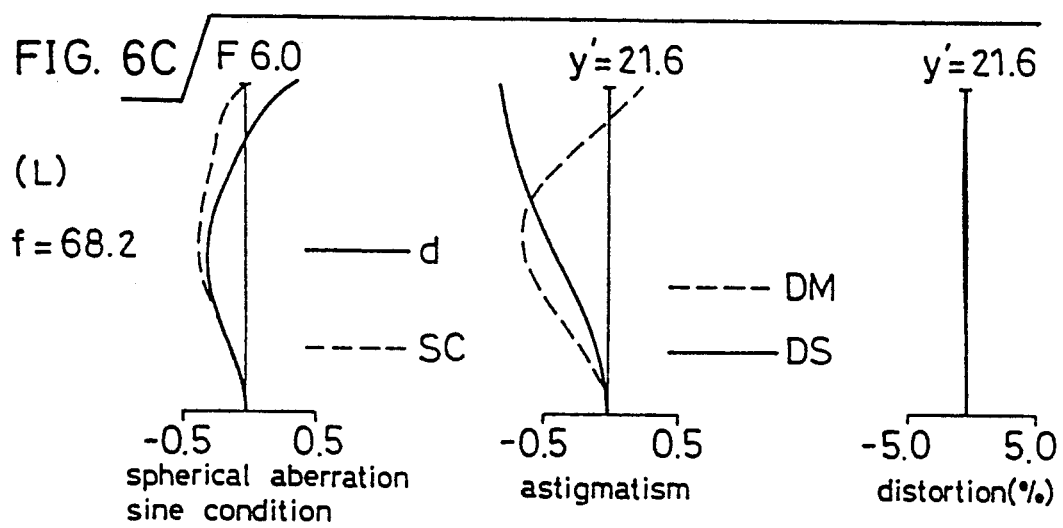

(S)

(L)

(S)

(L)

(S)

(L)

(S)

(M)

(L)

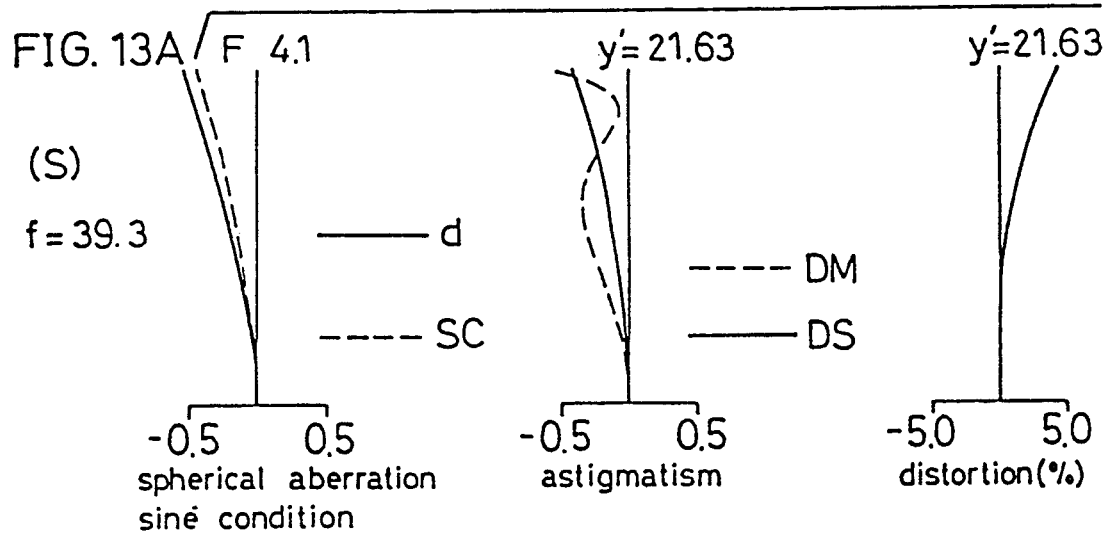
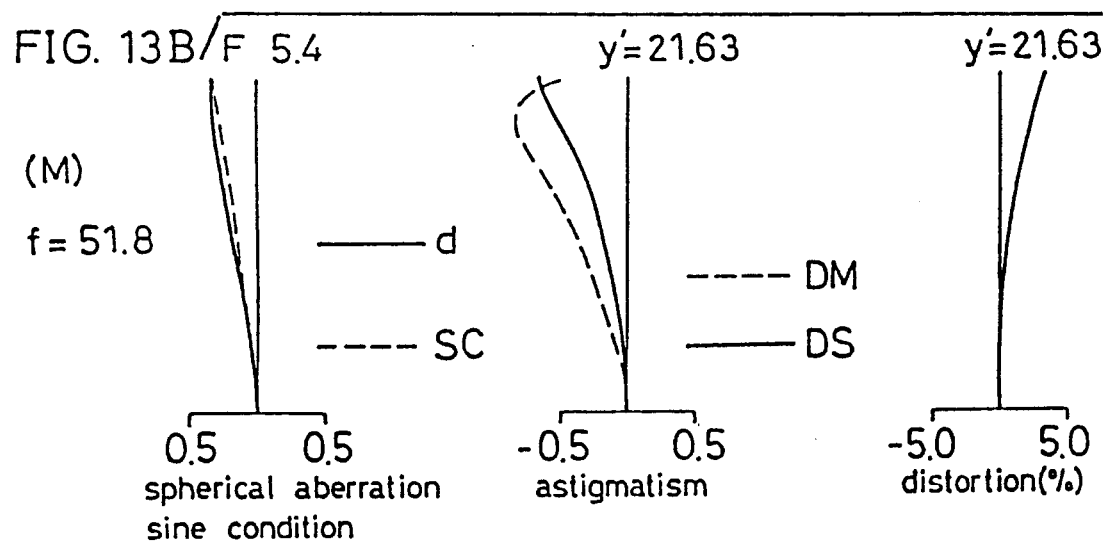

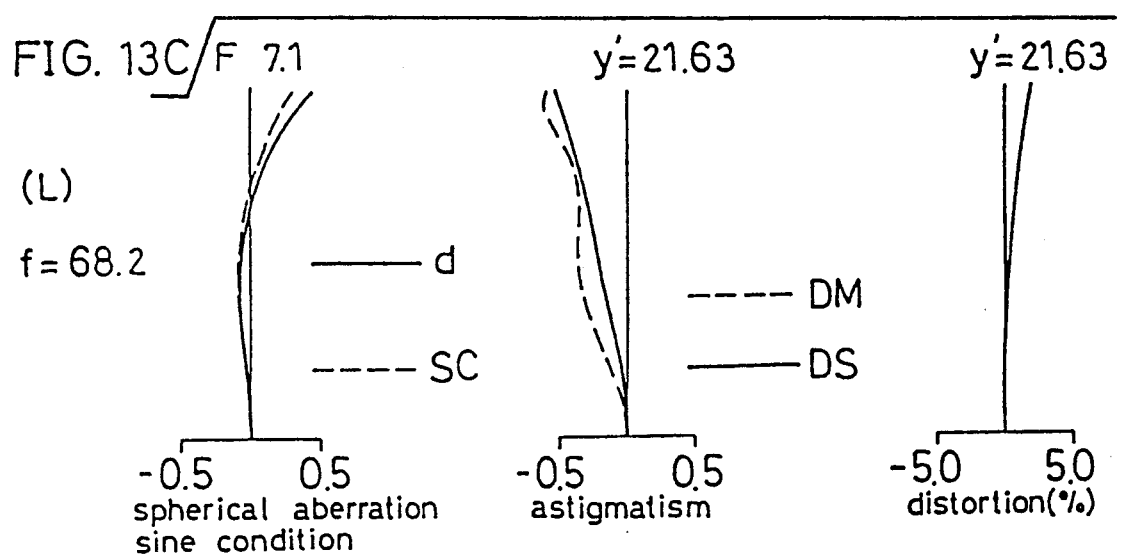

COMPACT-SIZE ZOOM LENS SYSTEM

BACKGROUND OF THE INVENTION

1. Field of the Invention

The present invention relates to a compact-size zoom lens system, especially of a type suited for a built-in zoom lens system of a lens shutter camera.

2. Description of the Related Art

A lens system built in a lens shutter camera is required to be compact, light-weight and low cost. When a zoom lens system is used in a lens shutter camera, the requirements are just the same. For making a zoom lens system compact including the lens shifting space for zooming the refractive power of every lens group must be strong. In order to obtain a strong refractive power of a lens group while maintaining a high optical quality, the number of lenses in the lens group should increase. However, the increase in the number of lenses naturally increases the weight and the cost. Thus, the prior art is still seeking to provide an improved compact-size zoom lens system.

SUMMARY OF THE INVENTION

Therefore an object of the present invention is to provide a compact-size, light-weight and low-cost zoom lens system by restricting undesirable light rays.

One feature of the zoom lens system according to the present invention is that the zoom lens system includes a ray restrictor at the object side of any of the lenses of the zoom lens system, and the ray restrictor can move along the optical axis of the zoom lens system according to a zooming operation at a speed different from that of the most object side lens of the zoom lens system.

Another feature of the zoom lens system according to the present invention is that the zoom lens system includes a ray restrictor at the object side of any of the lenses of the zoom lens system, and the ray restrictor has an aperture whose diameter is variable according to a zooming operation.

BRIEF DESCRIPTION OF THE DRAWINGS

FIGS. 4A, 4B and 4C show aberration curves of the first example at the shortest focal length (S), at the midpoint focal length (M) and at the longest focal length (L), respectively.

FIGS. 5A, 5B and 5C show aberration curves of the first example at the shortest focal length (S), at the midpoint focal length (M) and at the longest focal length (L), respectively.

FIGS. 6A, 6B and 6C show aberration curves of the first example at the shortest focal length (S), at the midpoint focal length (M) and at the longest focal length (L), respectively.

FIGS. 13A, 13B and 13C show aberration curves of the fourth example at the shortest focal length (S), at the midpoint focal length (M) and at the longest focal length (L), respectively. In FIGS. 4A–6C and 13A–13C, f is the focal length of the whole zoom lens system, d denotes aberrations for the d line, SC denotes the sine condition, and DM and DS denote the astigmatism for the maridional direction and for the sagittal direction, respectively.

DETAILED DESCRIPTION OF THE PREFERRED EMBODIMENT

Figure 1:
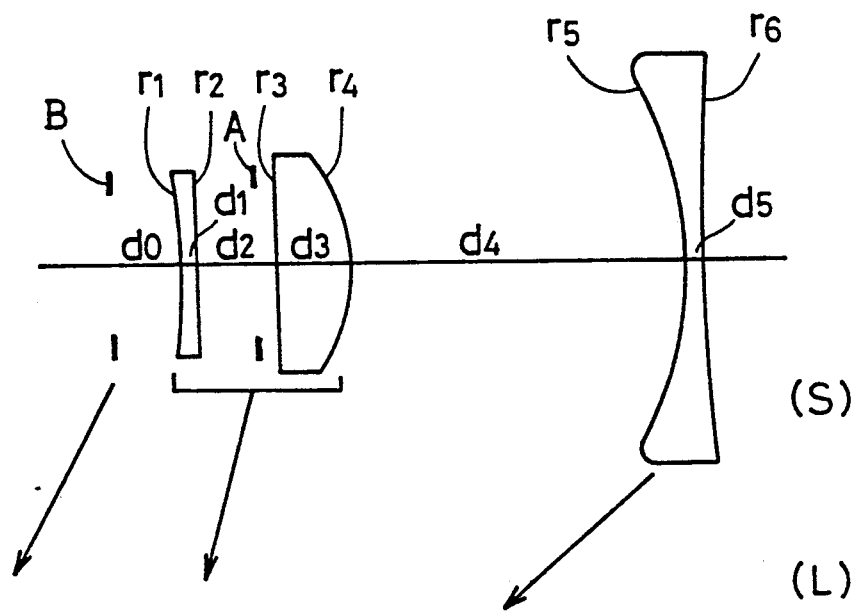
FIG. 1 is a sectional view illustrating the lens configuration with the movement of every lens group during a zooming operation from the shortest focal length <S> to the longest focal length <L> of the first example of the present invention.

The present invention is especially preferred to be applied in a two-component zoom lens system. That is, the zoom lens system is composed of, from the object side to the image side, a front lens group having a positive refractive power and a rear lens group having a negative refractive power. In this case, the front lens group and the rear lens group move from the image side to the object side when a zooming operation is performed from a shorter focal length to a longer focal length, and the ray restrictor also moves from the image side to the object side. Since the ray restrictor is placed near the front lens group at the shortest focal length condition, the peripheral light is not restricted and enough amount of light is admitted in the peripheral area. Since the ray restrictor recedes from the front lens group at a position intermediate to the longest focal lengths, coma flare due to intermediate rays (rays passing through the intermediate area between the on-axial area and the peripheral area) is effectively eliminated.

It is preferable that the aperture diameter is less than 1.2 times that of the axial light flux (an entrance pupil) at either the shortest focal length condition or the longest focal length condition, because otherwise it is difficult to eliminate coma flare due to intermediate rays especially at the longest focal length condition. It is more preferable to make the diameter of the ray restrictor less than 1.05 times the diameter of the axial light flux to eliminate coma flare due to the off-axial light flux at the longest focal length condition.

It is further preferable to make the ray restrictor shift in a linked body with the rear lens group (or shift at a preset rate of the shift of the rear lens group) while the zoom lens system is zoomed from the shortest focal length to the longest focal length because the structure of the lens barrel can be made simple.

An aspherical surface satisfying the following condition (1) is preferred to be included in the front lens group: for a height y from the optical axis of the zoom lens system satisfying $0.7 y_{MAX} < y < y_{MAX}$ where $y_{MAX}$ is the maximum effective radius of the aspherical surface, $$-0.03 < \phi_1 \cdot (N' - N) \cdot d\{x(y) - x_0(y)\}/dy < 0 \tag{1}$$

where $\phi_1$: refractive power of the front lens group,
N: refractive index of the medium at the object side of the aspherical surface,
N': refractive index of the medium at the image side of the aspherical surface,
x(y): axial deviation of the aspherical surface from its vertex at the height y, which is give by $$x(y) = (r/\epsilon)\{1 - (1 - \epsilon(y^2 r^2))^{\frac{1}{2}}\} + \Sigma A_i y^i$$

(summation $\Sigma$ made for $i \geq 2$)

$x_0(y)$: axial deviation of the reference spherical surface of the aspherical surface from its vertex at the height y, which is given by $$x_0(y) = \bar{r}\{1 - (1 - y^2 \bar{r}^2)^{\frac{1}{2}}\}$$

r: radius of curvature of the aspherical surface at the vertex,
$\epsilon$: quadric surface parameter,
$A_i$: aspherical coefficient of the i-th order, and
$\bar{r}$: radius of curvature at the vertex, which is given by $$1/\bar{r} = 1/r + 2A_2$$

Condition (1) indicates that the aspherical surface of the front lens group has a weaker positive refractive power (i.e., stronger negative refractive power) at the peripheral area than at the axial area. The aspherical surface is introduced to correct spherical aberrations. If the upper limit of the condition (1) is violated, the spherical aberrations cannot be corrected enough, and if the lower limit is violated, the spherical aberrations are over-corrected in the entire zooming region.

The rear lens group is preferred to include at least one aspherical surface satisfying the following condition (2):

for a height y from the optical axis of the zoom lens system satisfying $0.8 y_{MAX} < y < y_{MAX}$ where $y_{MAX}$ is the maximum effective radius of the aspherical surface, $$-0.10 < \phi_2 \cdot (N' - N) \cdot d\{x(y) - x_0(y)\}/dy < 0 \tag{2}$$

where $\phi_2$: refractive power of the rear lens group.

The condition (2) indicates that the aspherical surface of the rear lens group has a weaker negative refractive power (i.e., stronger positive refractive power) at the peripheral area than at the axial area. The aspherical surface is introduced in the rear lens group to correct the distortion and field curvature on balance at high levels. If the upper limit of the condition (2) is violated, the distortion at the shortest focal length positively grows conspicuously, and if the lower limit is violated, the field curvature apparently grows negative in the entire zooming range.

Every aspherical surface in the front lens group is preferred to satisfy the following condition (3):

for a height y from the optical axis of the zoom lens system satisfying $y \leq 0.7\ y_{MAX}$ where $y_{MAX}$ is the maximum effective radius of the aspherical surface, $$-0.02 < \phi_1 \cdot (N' - N) \cdot d\{x(y) - x_0(y)\}/dy < 0.01 \tag{3}$$

If the upper limit of the condition (3) is violated, the zonal aberration grows negative and the focus point deviates as the aperture becomes small. If the lower limit is violated, the spherical aberration is over-corrected for the intermediate rays causing unbalance between the spherical aberration and other aberrations and the spherical aberration becomes wavy.

Similarly, every aspherical surface in the rear lens group is preferred to satisfy the following condition (4):

for a height y from the optical axis of the zoom lens system satisfying $y \leq 0.8\ y_{MAX}$ where $y_{MAX}$ is the maximum effective radius of the aspherical surface, $$-0.05 < \phi_2 \cdot (N' - N) \cdot d\{x(y) - x_0(y)\}/dy < 0.02 \tag{4}$$

If the upper limit of the condition (4) is violated, the positive distortion and field curvature further grows positive in the intermediate focal lengths, i.e., between the shortest focal length and the midpoint focal length. If the lower limit is violated, on the other hand, the negative distortion grows in the range between the midpoint to the longest focal lengths, and the field curvature shifts toward negative in the entire zooming range.

Thus, by placing a ray restrictor at the object side of the front lens group and shifting the ray restrictor toward the object at a speed different from that of the most object side lens of the zoom lens system when the zoom lens system is zoomed from the shorter to the longer focal length, various aberrations, especially coma flare due to the intermediate rays, are adequately corrected. When the ray restrictor is used in combination with an aspherical surface (or surfaces) provided in the front or rear lens group, the lens construction can be very simple. For example, it is possible to compose the front lens group with two lens elements and the rear lens group with only one lens element.

The axial distance between the front lens group and the rear lens group at the longest focal length condition is preferred to satisfy the following condition (5):

$$0.1 < \Delta T_{12}/f_T < 0.4 \tag{5}$$

where $\Delta T_{12}$: axial distance between the most image side surface of the front lens group to the most object side surface of the rear lens group, and
$f_T$: the longest focal length of the zoom lens system.

When the upper limit of the condition (5) is violated, the overall length (i.e., the distance between the most object side surface of the front lens group and the film surface at the shortest focal length condition) of the zoom lens system becomes too large. When the lower limit is violated, the optical quality deteriorates, specifically the off-axial coma grows at the longest focal length condition.

The zoom lens system according to the present invention is further preferred to satisfy the following condition (6):

$$0.40 < f_2/f_w < 0.75 \tag{6}$$

where $f_2$: focal length of the image side lens element of the front lens group, and
$f_w$: the shortest focal length of the zoom lens system.

When the upper limit of the condition (6) is violated, coma flare due to the intermediate rays grows conspicuously in the shortest focal length condition. When the lower limit is violated, the optical quality of the zoom lens system deteriorates, specifically the coma flare due to the intermediate rays grows large in the longest focal length condition.

It is further preferred that at least one lens element composing a zoom lens system of the present invention has aspherical surfaces at both sides.

Altering the aperture diameter of the ray restrictor while shifting the ray restrictor in a linked body with the most object side lens of the zoom lens system has the same effect as above (where the ray restrictor shifts at a speed different from that of the most object side lens).

Four examples of the zoom lens system according to the present invention are described now. In the following list of lens data of the examples:

$r_i$ ($1 \leq i \leq 6$) is the radius of curvature of the i-th surface as counted from the object side, $d_i$ ($1 \leq i \leq 6$) is the axial distance between two adjacent surfaces i and i+1 (or between a surface and the ray restrictor or stop), $N_j$ ($1 \leq i \leq 3$) is the refractive index for the d line of the j-th lens element as counted from the object side, $\nu_j$ ($1 \leq i \leq 3$) is the Abbe number of the j-th lens element, f is the focal length of the zoom lens system, and $F_{NO}$ is the open (minimum) f-number.

The surface with an asterisk (*) after the radius of curvature ($r_i$) in the list is an aspherical surface, whose surface shape is defined by the formulae as described above.

Example 1 shown in FIG. 1 is a zoom lens system composed of, from the object side: a ray restrictor (B); a front lens group including a first lens element having a negative refractive power, an aperture stop (A), and a second lens element having a strong positive refractive power; and a rear lens group including solely a third lens element having a negative refractive power. The first lens element is a negative meniscus lens concave at the object side, the second lens element is convex at the image side, and the third lens element is a bi-concave lens. The object side and image side surfaces of the first lens element, the image side surface of the second lens element and the object side and image side surfaces of the third lens elements are aspherical.

Figure 2:
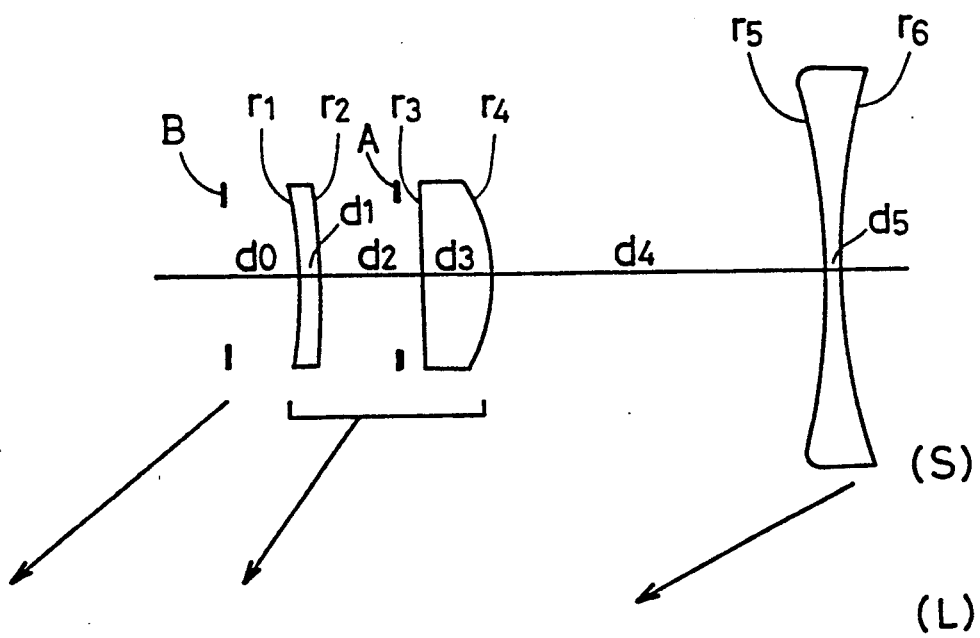
FIG. 2 is a sectional view illustrating the lens configuration with the movement of every lens group during a zooming operation from the shortest focal length <S> to the longest focal length <L> of the second example of the present invention.

Example 2 shown in FIG. 2 is a zoom lens system composed of, from the object side: a ray restrictor (B); a front lens group including a first lens element having a negative refractive power, an aperture stop (A), and a second lens element having a strong positive refractive power; and a rear lens group including solely a third lens element having a negative refractive power. The first lens element is a negative meniscus lens concave at the object side, the second lens element is convex at the image side, and the third lens element is a bi-concave lens. The object side and image side surfaces of the first lens element, the image side surface of the second lens element and the object side and image side surfaces of the third lens elements are aspherical.

Figure 3:
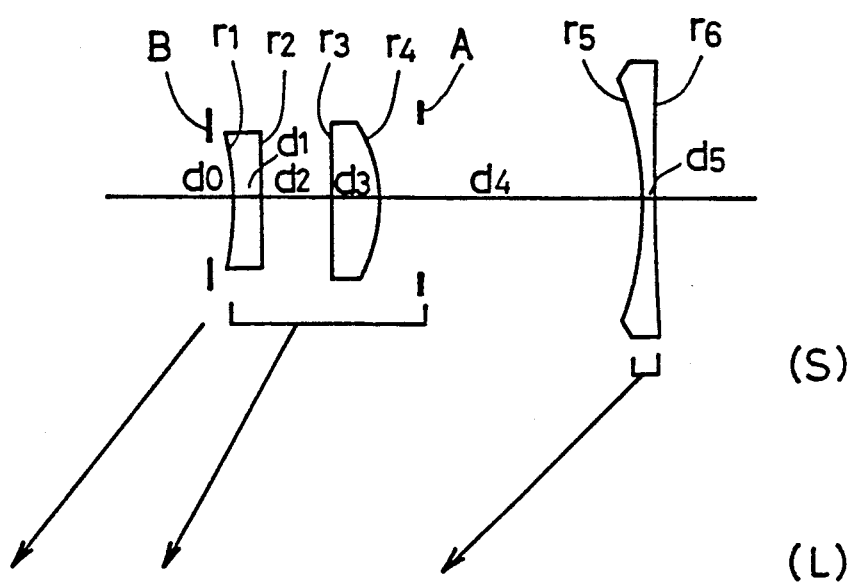
FIG. 3 is a sectional view illustrating the lens configuration with the movement of every lens group during a zooming operation from the shortest focal length <S> to the longest focal length <L> of the third example of the present invention.
Figure 4A:
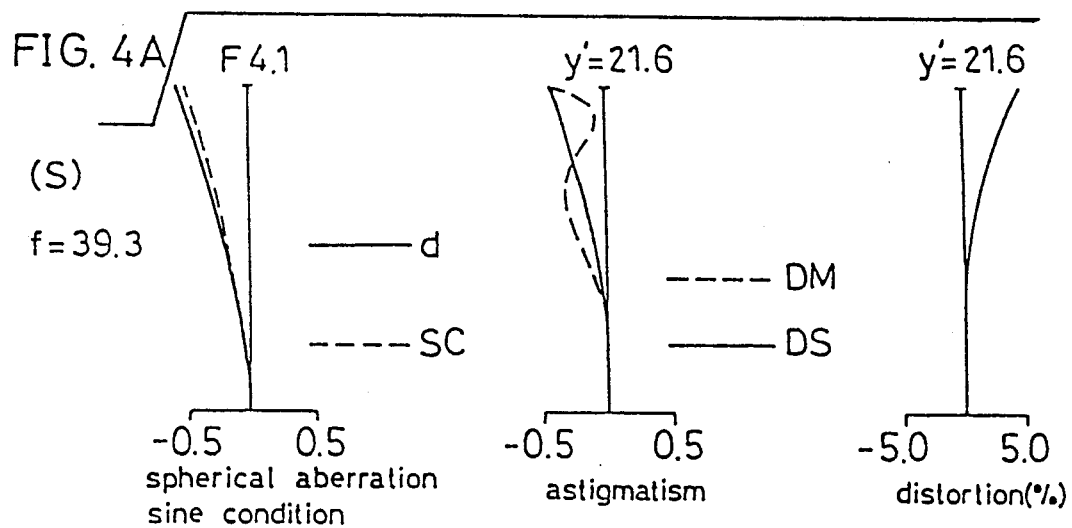
Figure 4B:
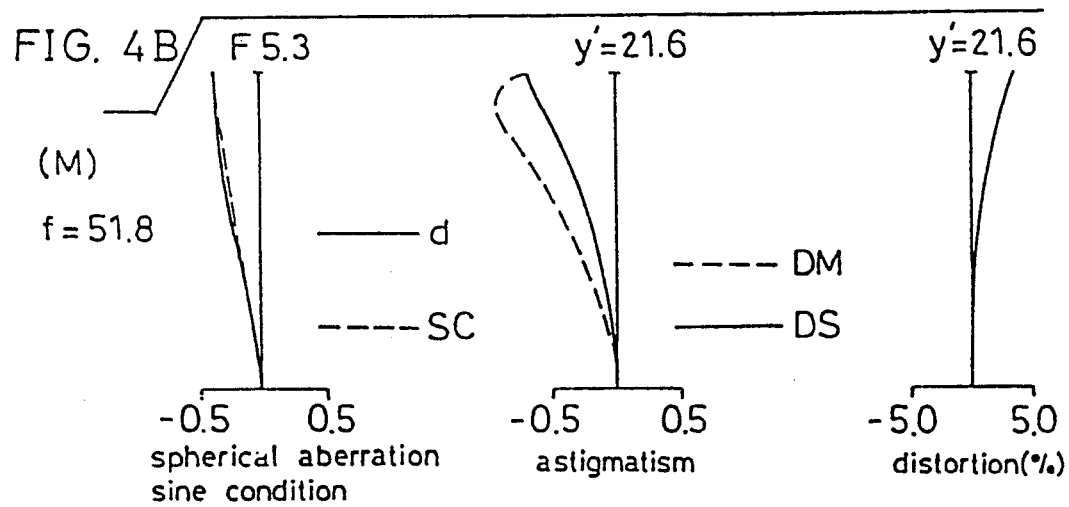

Example 3 shown in FIG. 3 is a zoom lens system composed of, from the object side; a ray restrictor (B); a front lens group including a first lens element having a negative refractive power, a second lens element having a strong positive refractive power, and an aperture stop (A); and a rear lens group including solely a third lens element having a negative refractive power. The first lens element is a negative meniscus lens concave at the object side, the second lens element is convex at the image side, and the third lens element is a bi-concave lens. The object side and image side surfaces of the first lens element, the image side surface of the second lens element and the object side and image side surfaces of the third lens elements are aspherical.

Example 4 has the same optical structure as that of the example 1 shown in FIG. 1, except that the ray restrictor (B) shifts in a linked body with the first lens group on the optical axis and the aperture diameter of the ray restrictor (B) varies during a zooming operation.

The aberrations of the example zoom lens systems are shown in FIGS. 4A-6C and 13A-13C respectively for the shortest <S>, midpoint <M> and longest <L> focal length conditions.

Figure 7:
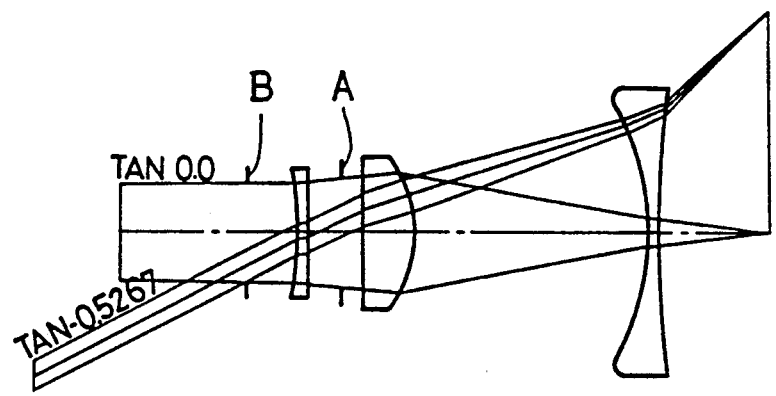
FIG. 7 is a light path diagram of the first example at the shortest focal length (S).
Figure 8:
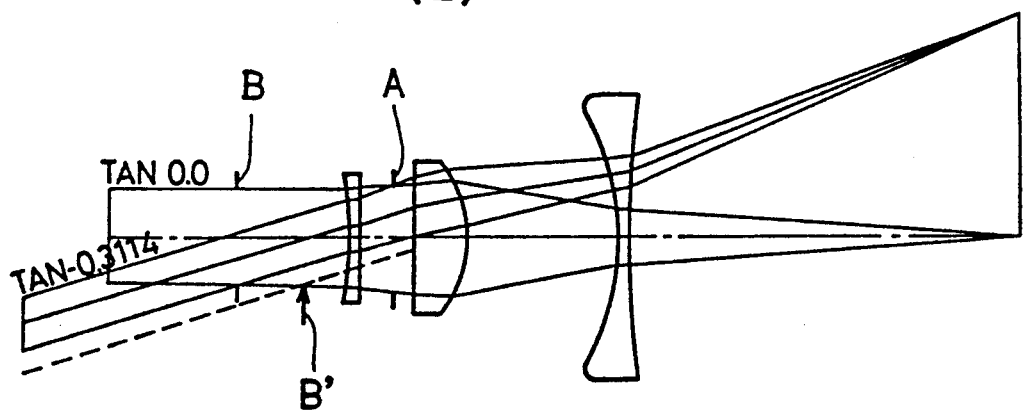
FIG. 8 is a light path diagram of the first example at the longest focal length (L).
Figure 9:
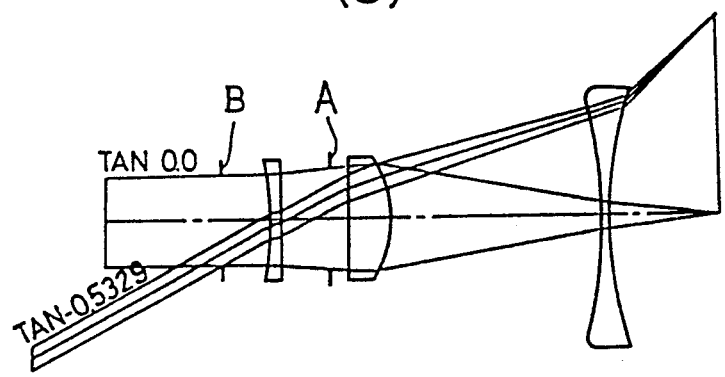
FIG. 9 is a light path diagram of the second example at the shortest focal length (S).
Figure 10:
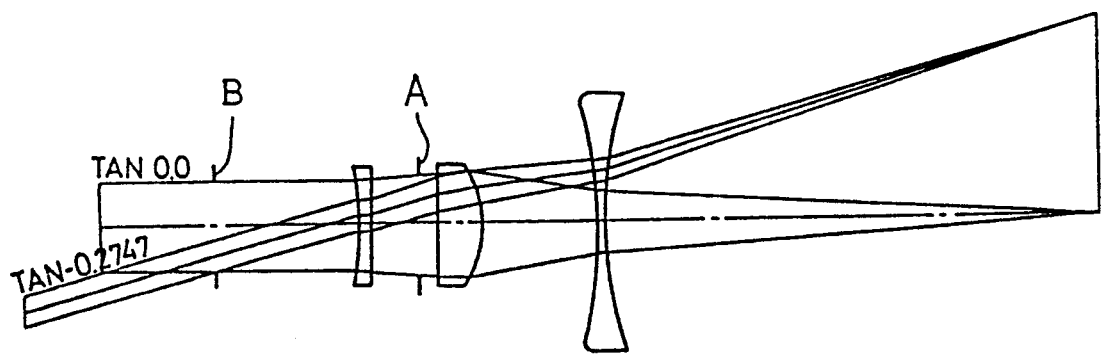
FIG. 10 is a light path diagram of the second example at the longest focal length (L).
Figure 11A:
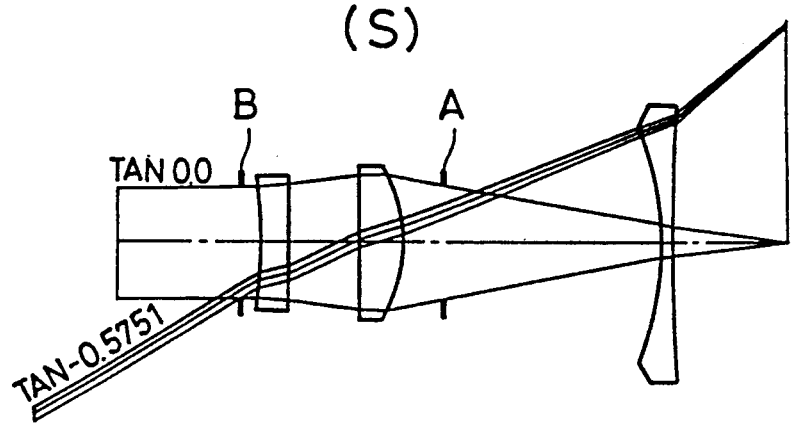
FIG. 11A is a light path diagrams of the third example at the shortest focal length (S)
Figure 11B:
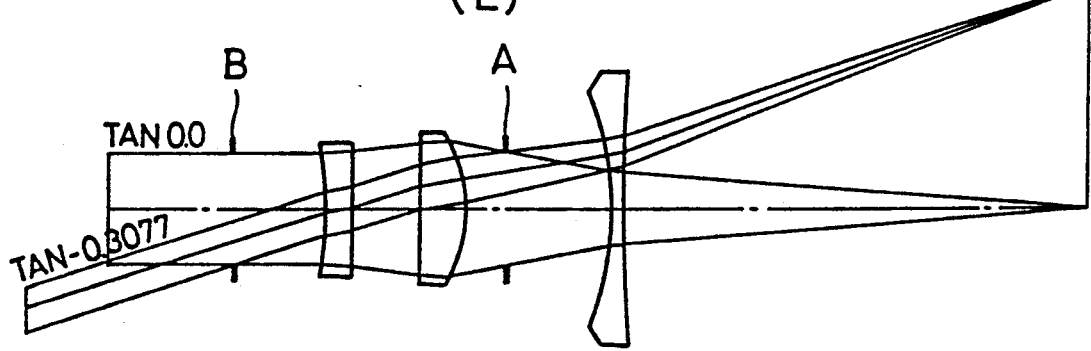
FIG. 11B is that at the longest focal length (L).
Figure 12A:
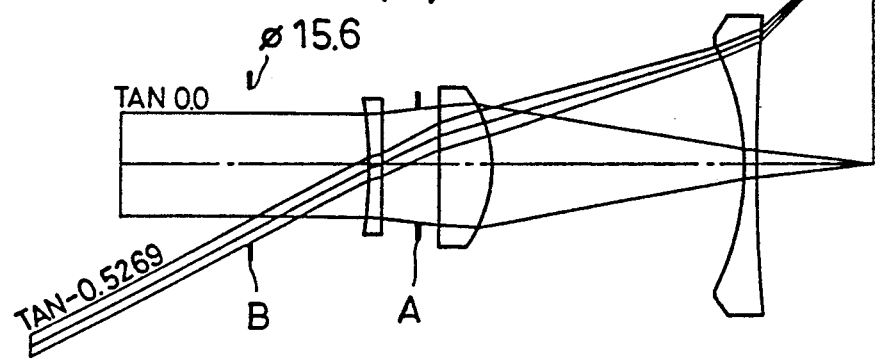
FIG. 12A is a light path diagrams of the fourth example at the shortest focal length (S)
Figure 12B:
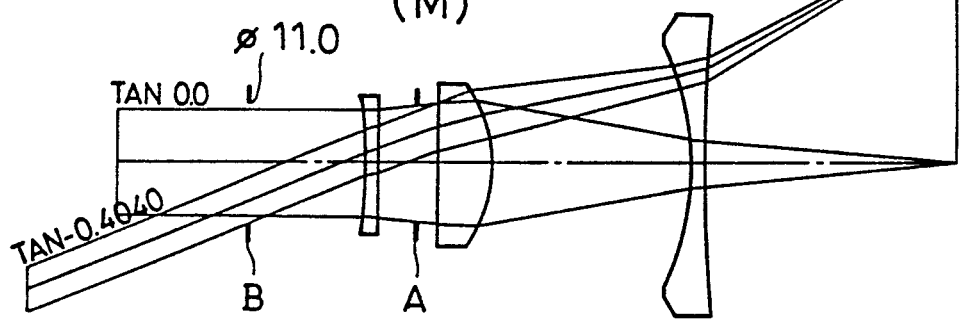
FIG. 12B is that at the midpoint focal length (M)
Figure 12C:
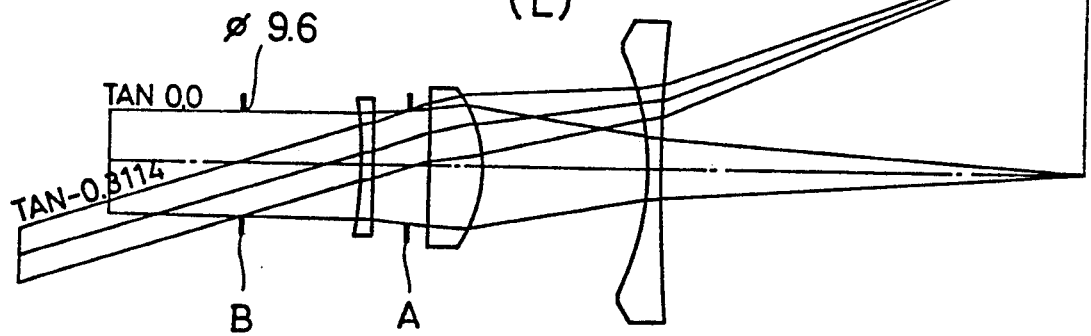
FIG. 12C is that at the longest focal length (L).

FIGS. 7 and 8 show the effect of the ray restrictor (B) of the first example. If the ray restrictor (B) moves in a linked body with the front lens group in zooming, the ray restrictor would be at the position B' at the longest focal length condition (FIG. 8). In such a case, harmful off-axial ray denoted by the dashed line would come in the front lens group. In the example 1, however, the ray restrictor (B) recedes from the front lens group as the zoom lens system is zoomed toward the longest focal length, and the harmful off-axial ray is blocked.

Tables 1–3 respectively show values of the second term of conditions (1) through (4) of the examples 1–4. Table 4 shows the values of $\Delta T_{12}/f_T$ of the condition (5), $f_2/f_w$ of the condition (6), and the refractive power $\phi_{G2}$ of the image side lens element of the front lens group (i.e., the second lens element).

The four examples according to the present invention have the focal length range of 38–70 mm or 38–80 mm. No conventional zoom lens system composed of three lens elements has such focal length range. Since, in the zoom lens system of one embodiment of the present invention, the ray restrictor placed at the object side shifts toward the object at a speed different from that of the most object side lens as the zoom lens system is zoomed to the longest focal length, the ray restrictor blocks coma-flare-causing rays and only the most suitable rays are allowed to pass therethrough at any position during the zooming operation. In a zoom lens system of another embodiment of the present invention, the ray restrictor placed at the object side has the aperture whose diameter decreases when the zoom lens system is zoomed to a longer focal length. Therefore, the ray restrictor also restricts undesirable rays incident on the zoom lens system.

When an aspherical surface or surfaces are used in the zoom lens system of the present invention as described above, various aberrations are further corrected at a high level, which has enabled composing a high quality zoom lens with a less number of lens elements. For example, the examples described below are composed of only three lens elements and have a zoom ratio exceeding 1.7. Thus the zoom lens system of the present invention is suitable for a built-in zoom lens system of a compact-size lens shutter camera.

EXAMPLE 1

| $f = 39.3 \sim 51.8 \sim 68.2$ $F_{NO} = 4.1 \sim 5.3 \sim 7.0$ | | | |
|---|---|---|---|
| radius of curvature | axial distance | refractive index | Abbe number |
| restrictor(B) | | | |

-continued

|  |  |  |  |  |
|---|---|---|---|---|
|  | $d_0$ 4.896~7.396~10.896 |  |  |  |
| $r_1^*$ −51.463 |  |  |  |  |
|  | $d_1$ 1.000 |  | $N_1$ 1.83350 | $\nu_1$ 21.00 |
| $r_2^*$ −209.509 |  |  |  |  |
|  | $d_2$ 3.349 |  |  |  |
| stop(A) |  |  |  |  |
|  | $d_3$ 2.000 |  |  |  |
| $r_3$ −334.805 |  |  |  |  |
|  | $d_4$ 4.989 |  | $N_2$ 1.51680 | $\nu_2$ 64.20 |
| $r_4^*$ −11.561 |  |  |  |  |
|  | $d_5$ 22.876~18.367~14.943 |  |  |  |
| $r_5^*$ −24.139 |  |  |  |  |
|  | $d_6$ 1.044 |  | $N_3$ 1.77250 | $\nu_3$ 49.77 |
| $r_6^*$ 144.891 |  |  |  |  |
|  | $\Sigma d = 40.153 \sim 38.145 \sim 38.220$ |  |  |  | aspherical coefficients $r_1$: $\epsilon = 0.27563 \times 10$
$A_4 = -0.57377 \times 10^{-4}$
$A_6 = -0.28791 \times 10^{-6}$
$A_8 = -0.25981 \times 10^{-7}$
$A_{10} = 0.71952 \times 10^{-9}$
$A_{12} = -0.17910 \times 10^{-10}$ $r_2$: $\epsilon = -0.95676$
$A_4 = 0.32319 \times 10^{-4}$
$A_6 = 0.31975 \times 10^{-6}$
$A_8 = -0.29096 \times 10^{-8}$
$A_{10} = -0.86424 \times 10^{-10}$
$A_{12} = -0.16278 \times 10^{-11}$ $r_4$: $\epsilon = 0.11348 \times 10$
$A_4 = 0.34973 \times 10^{-4}$
$A_6 = 0.13838 \times 10^{-6}$
$A_8 = 0.65555 \times 10^{-9}$
$A_{10} = -0.92932 \times 10^{-11}$
$A_{12} = 0.48225 \times 10^{-12}$ $r_5$: $\epsilon = 0.25432 \times 10$
$A_4 = 0.55479 \times 10^{-4}$
$A_6 = -0.16122 \times 10^{-6}$
$A_8 = 0.22221 \times 10^{-8}$
$A_{10} = -0.53141 \times 10^{-10}$
$A_{12} = 0.26081 \times 10^{-12}$ $r_6$: $\epsilon = -0.22241 \times 10$
$A_4 = 0.26936 \times 10^{-4}$
$A_6 = 0.27385 \times 10^{-8}$
$A_8 = -0.25504 \times 10^{-8}$
$A_{10} = 0.11840 \times 10^{-10}$
$A_{12} = 0.11070 \times 10^{-13}$

EXAMPLE 2

| $f = 39.3 \sim 55.2 \sim 77.5$ $F_{NO} = 4.0 \sim 5.7 \sim 8.0$ |  |  |  |
|---|---|---|---|
| radius of curvature | axial distance | refractive index | Abbe number |
| restrictor(B) |  |  |  |
|  | $d_0$ 5.215~8.715~15.215 |  |  |
| $r_1^*$ −36.716 |  |  |  |
|  | $d_1$ 1.222 | $N_1$ 1.83350 | $\nu_1$ 21.00 |
| $r_2^*$ −64.476 |  |  |  |
|  | $d_2$ 5.066 |  |  |
| stop(A) |  |  |  |
|  | $d_3$ 2.000 |  |  |
| $r_3$ −188.456 |  |  |  |
|  | $d_4$ 4.548 | $N_2$ 1.51680 | $\nu_2$ 64.20 |
| $r_4^*$ −12.087 |  |  |  |
|  | $d_5$ 22.768~16.425~11.908 |  |  |
| $r_5^*$ −50.454 |  |  |  |
|  | $d_6$ 1.000 | $N_3$ 1.77250 | $\nu_3$ 49.77 |
| $r_6^*$ 45.050 |  |  |  |
|  | $\Sigma d = 41.818 \sim 38.975 \sim 40.958$ |  |  | aspherical coefficients $r_1$: $\epsilon = 0.15018 \times 10$
$A_4 = -0.32667 \times 10^{-4}$
$A_6 = -0.19314 \times 10^{-8}$
$A_8 = -0.26162 \times 10^{-7}$
$A_{10} = 0.75722 \times 10^{-9}$
$A_{12} = -0.13941 \times 10^{-10}$ $r_2$: $\epsilon = -0.94829$
$A_4 = 0.28608 \times 10^{-4}$
$A_6 = 0.18842 \times 10^{-6}$
$A_8 = -0.24996 \times 10^{-8}$
$A_{10} = 0.49380 \times 10^{-10}$
$A_{12} = -0.67270 \times 10^{-11}$ $r_4$: $\epsilon = 0.10020 \times 10$
$A_4 = 0.41090 \times 10^{-4}$
$A_6 = 0.37818 \times 10^{-7}$
$A_8 = 0.58283 \times 10^{-9}$
$A_{10} = 0.36793 \times 10^{-10}$
$A_{12} = -0.34580 \times 10^{-12}$ $r_5$: $\epsilon = 0.27377 \times 10$
$A_4 = 0.48509 \times 10^{-4}$
$A_6 = -0.23791 \times 10^{-6}$
$A_8 = 0.21497 \times 10^{-8}$
$A_{10} = -0.42474 \times 10^{-10}$
$A_{12} = 0.17971 \times 10^{-12}$ $r_6$: $\epsilon = -0.21359 \times 10$
$A_4 = 0.29356 \times 10^{-4}$
$A_6 = 0.29483 \times 10^{-7}$
$A_8 = -0.25430 \times 10^{-8}$
$A_{10} = 0.79055 \times 10^{-11}$
$A_{12} = 0.40582 \times 10^{-14}$

EXAMPLE 3

| $f = 39.3 \sim 51.8 \sim 68.2$ $F_{NO} = 3.6 \sim 4.7 \sim 6.0$ |  |  |  |
|---|---|---|---|
| radius of curvature | axial distance | refractive index | Abbe number |
| restrictor(B) |  |  |  |
|  | $d_0$ 2.000~5.500~9.000 |  |  |
| $r_1^*$ −45.265 |  |  |  |
|  | $d_1$ 2.737 | $N_1$ 1.84666 | $\nu_1$ 23.82 |
| $r_2^*$ −134.812 |  |  |  |
|  | $d_2$ 6.647 |  |  |
| $r_3$ 443.093 |  |  |  |
|  | $d_3$ 4.479 | $N_2$ 1.51680 | $\nu_2$ 64.20 |
| $r_4^*$ −13.153 |  |  |  |
|  | $d_4$ 3.700 |  |  |
| stop(A) |  |  |  |
|  | $d_5$ 21.181~14.940~10.200 |  |  |
| $r_5^*$ −32.438 |  |  |  |
|  | $d_6$ 1.044 | $N_3$ 1.72900 | $\nu_3$ 53.48 |
| $r_6^*$ 115.276 |  |  |  |
|  | $\Sigma d = 41.789 \sim 53.664 \sim 71.663$ |  |  | aspherical coefficients $r_1$: $\epsilon = -0.17535$
$A_4 = -0.29592 \times 10^{-4}$
$A_6 = 0.12066 \times 10^{-6}$
$A_8 = -0.20055 \times 10^{-7}$
$A_{10} = 0.82177 \times 10^{-9}$
$A_{12} = -0.11741 \times 10^{-10}$ $r_2$: $\epsilon = 0.23617 \times 10$
$A_4 = 0.27941 \times 10^{-4}$
$A_6 = 0.54904 \times 10^{-6}$
$A_8 = 0.98187 \times 10^{-9}$
$A_{10} = 0.84612 \times 10^{-11}$
$A_{12} = -0.11309 \times 10^{-11}$ $r_4$: $\epsilon = 0.13359 \times 10$
$A_4 = 0.43666 \times 10^{-4}$
$A_6 = 0.42178 \times 10^{-7}$
$A_8 = 0.71801 \times 10^{-9}$
$A_{10} = 0.18344 \times 10^{-10}$
$A_{12} = 0.13664 \times 10^{-12}$ $r_5$: $\epsilon = 0.26567 \times 10$
$A_4 = 0.24062 \times 10^{-4}$
$A_6 = -0.21968 \times 10^{-6}$
$A_8 = 0.13828 \times 10^{-8}$
$A_{10} = -0.88598 \times 10^{-11}$
$A_{12} = 0.13382 \times 10^{-13}$ $r_6$: $\epsilon = 0.13573 \times 10$
$A_4 = 0.17944 \times 10^{-5}$
$A_6 = 0.55391 \times 10^{-7}$
$A_8 = -0.18417 \times 10^{-8}$
$A_{10} = 0.11461 \times 10^{-10}$
$A_{12} = -0.27114 \times 10^{-13}$

EXAMPLE 4

| radius of curvature | axial distance | refractive index | Abbe number |
|---|---|---|---|
| restrictor(B) | | | |
| | $d_0$ 10.896 | | |
| $r_1$* −51.463 | | | |
| | $d_1$ 1.000 | $N_1$ 1.83350 | $\nu_1$ 21.00 |
| $r_2$* −209.509 | | | |
| | $d_2$ 3.349 | | |
| stop(A) | | | |
| | $d_3$ 2.000 | | |
| $r_3$ −334.805 | | | |
| | $d_4$ 4.989 | $N_2$ 1.51680 | $\nu_2$ 64.20 |
| $r_4$* −11.561 | | | |
| | $d_5$ 22.876∼18.367∼14.943 | | |
| $r_5$* −24.139 | | | |
| | $d_6$ 1.044 | $N_3$ 1.77250 | $\nu_3$ 49.77 |
| $r_6$* 144.891 | | | |

$f = 39.3 \sim 51.8 \sim 68.2 \quad F_{NO} = 4.1 \sim 5.3 \sim 7.0$ $\Sigma d = 40.153 \sim 38.145 \sim 38.220$ aspherical coefficients $r_1$: $\epsilon = 0.27563 \times 10$
$A_4 = -0.57377 \times 10^{-4}$
$A_6 = -0.28791 \times 10^{-6}$
$A_8 = -0.25981 \times 10^{-7}$
$A_{10} = 0.71952 \times 10^{-9}$
$A_{12} = -0.17910 \times 10^{-10}$ $r_2$: $\epsilon = -0.95676$
$A_4 = 0.32319 \times 10^{-4}$
$A_6 = 0.31975 \times 10^{-6}$
$A_8 = -0.29096 \times 10^{-8}$
$A_{10} = -0.86424 \times 10^{-10}$
$A_{12} = -0.16278 \times 10^{-11}$ $r_4$: $\epsilon = 0.11348 \times 10$
$A_4 = 0.34973 \times 10^{-4}$
$A_6 = 0.13838 \times 10^{-6}$
$A_8 = 0.65555 \times 10^{-9}$
$A_{10} = -0.92932 \times 10^{-11}$
$A_{12} = 0.48225 \times 10^{-12}$ $r_5$: $\epsilon = 0.25432 \times 10$
$A_4 = 0.55479 \times 10^{-4}$
$A_6 = -0.16122 \times 10^{-6}$
$A_8 = 0.22221 \times 10^{-8}$
$A_{10} = -0.53141 \times 10^{-10}$
$A_{12} = 0.26081 \times 10^{-12}$ $r_6$: $\epsilon = -0.22241 \times 10$
$A_4 = 0.26936 \times 10^{-4}$
$A_6 = 0.27385 \times 10^{-8}$
$A_8 = -0.25504 \times 10^{-8}$
$A_{10} = 0.11840 \times 10^{-10}$
$A_{12} = 0.11070 \times 10^{-13}$

TABLE 1

[Example 1, Example 4]

| y | $A_{FR}$*1 | | | $A_{RE}$*2 | |
|---|---|---|---|---|---|
| | $r_1$ | $r_2$ | $r_4$ | $r_5$ | $r_6$ |
| 0.1 $y_{max}$ | −1.12 × 10$^{-6}$ | −6.64 × 10$^{-6}$ | −5.24 × 10$^{-7}$ | −6.04 × 10$^{-6}$ | 6.80 × 10$^{-6}$ |
| 0.2 $y_{max}$ | −9.08 × 10$^{-6}$ | −5.40 × 10$^{-6}$ | −4.19 × 10$^{-6}$ | −4.71 × 10$^{-5}$ | 5.41 × 10$^{-5}$ |
| 0.3 $y_{max}$ | −3.10 × 10$^{-5}$ | −1.86 × 10$^{-5}$ | −1.42 × 10$^{-5}$ | −1.53 × 10$^{-4}$ | 1.77 × 10$^{-4}$ |
| 0.4 $y_{max}$ | −7.54 × 10$^{-5}$ | −4.53 × 10$^{-5}$ | −3.41 × 10$^{-5}$ | −3.43 × 10$^{-4}$ | 3.86 × 10$^{-4}$ |
| 0.5 $y_{max}$ | −1.53 × 10$^{-4}$ | −9.12 × 10$^{-5}$ | −6.73 × 10$^{-5}$ | −6.14 × 10$^{-4}$ | 6.35 × 10$^{-4}$ |
| 0.6 $y_{max}$ | −2.79 × 10$^{-4}$ | −1.62 × 10$^{-4}$ | −1.23 × 10$^{-4}$ | −9.09 × 10$^{-4}$ | 7.90 × 10$^{-4}$ |
| 0.7 $y_{max}$ | −4.75 × 10$^{-4}$ | −2.62 × 10$^{-4}$ | −1.90 × 10$^{-4}$ | −1.07 × 10$^{-3}$ | 6.63 × 10$^{-4}$ |
| 0.8 $y_{max}$ | −7.80 × 10$^{-4}$ | −3.90 × 10$^{-4}$ | −2.91 × 10$^{-4}$ | −8.09 × 10$^{-4}$ | 9.45 × 10$^{-5}$ |
| 0.9 $y_{max}$ | −1.26 × 10$^{-3}$ | −5.31 × 10$^{-4}$ | −4.30 × 10$^{-4}$ | 6.74 × 10$^{-5}$ | −6.94 × 10$^{-4}$ |
| 1.0 $y_{max}$ | −2.18 × 10$^{-3}$ | −6.37 × 10$^{-4}$ | −6.30 × 10$^{-4}$ | 8.31 × 10$^{-4}$ | −6.07 × 10$^{-4}$ |

*1 $A_{FR} = \phi_1 \cdot (N' - N) \cdot d\{x(y) - x_0(y)\}/dy$
*2 $A_{RE} = \phi_2 \cdot (N' - N) \cdot d\{x(y) - x_0(y)\}/dy$

TABLE 2

[Example 2]

| y | $A_{FR}$ | | | $A_{RE}$ | |
|---|---|---|---|---|---|
| | $r_1$ | $r_2$ | $r_4$ | $r_5$ | $r_6$ |
| 0.1 $y_{max}$ | −6.48 × 10$^{-7}$ | −6.19 × 10$^{-7}$ | −5.48 × 10$^{-7}$ | −4.59 × 10$^{-5}$ | 5.57 × 10$^{-6}$ |
| 0.2 $y_{max}$ | −5.22 × 10$^{-6}$ | −4.77 × 10$^{-6}$ | −4.35 × 10$^{-6}$ | −1.59 × 10$^{-4}$ | 4.45 × 10$^{-5}$ |
| 0.3 $y_{max}$ | −1.80 × 10$^{-5}$ | −1.64 × 10$^{-5}$ | −1.47 × 10$^{-5}$ | −3.68 × 10$^{-4}$ | 1.47 × 10$^{-4}$ |
| 0.4 $y_{max}$ | −4.41 × 10$^{-5}$ | −3.94 × 10$^{-5}$ | −3.50 × 10$^{-5}$ | −6.67 × 10$^{-4}$ | 3.26 × 10$^{-4}$ |
| 0.5 $y_{max}$ | −9.09 × 10$^{-5}$ | −7.85 × 10$^{-5}$ | −6.88 × 10$^{-5}$ | −9.94 × 10$^{-4}$ | 5.38 × 10$^{-4}$ |
| 0.6 $y_{max}$ | −1.69 × 10$^{-4}$ | −1.38 × 10$^{-4}$ | −1.20 × 10$^{-4}$ | −1.17 × 10$^{-3}$ | 6.53 × 10$^{-4}$ |
| 0.7 $y_{max}$ | −2.95 × 10$^{-4}$ | −2.20 × 10$^{-4}$ | −1.93 × 10$^{-4}$ | −8.72 × 10$^{-4}$ | 4.39 × 10$^{-4}$ |
| 0.8 $y_{max}$ | −4.93 × 10$^{-4}$ | −3.19 × 10$^{-4}$ | −2.93 × 10$^{-4}$ | 1.29 × 10$^{-4}$ | −3.18 × 10$^{-4}$ |
| 0.9 $y_{max}$ | −8.13 × 10$^{-4}$ | −4.04 × 10$^{-4}$ | −4.28 × 10$^{-4}$ | 9.64 × 10$^{-4}$ | −1.45 × 10$^{-3}$ |
| 1.0 $y_{max}$ | −1.36 × 10$^{-3}$ | −3.84 × 10$^{-4}$ | −6.08 × 10$^{-4}$ | 8.82 × 10$^{-4}$ | −1.58 × 10$^{-3}$ |

TABLE 3

[Example 3]

| y | $A_{FR}$ | | | $A_{RE}$ | |
|---|---|---|---|---|---|
| | $r_1$ | $r_2$ | $r_4$ | $r_5$ | $r_6$ |
| 0.1 $y_{max}$ | −0.516 × 10$^{-6}$ | −0.602 × 10$^{-6}$ | −0.525 × 10$^{-6}$ | −0.208 × 10$^{-5}$ | 0.315 × 10$^{-6}$ |
| 0.2 $y_{max}$ | −0.413 × 10$^{-5}$ | −0.499 × 10$^{-5}$ | −0.666 × 10$^{-5}$ | −0.155 × 10$^{-4}$ | 0.291 × 10$^{-5}$ |
| 0.3 $y_{max}$ | −0.139 × 10$^{-4}$ | −0.176 × 10$^{-4}$ | −0.139 × 10$^{-4}$ | −0.460 × 10$^{-4}$ | 0.104 × 10$^{-4}$ |
| 0.4 $y_{max}$ | −0.329 × 10$^{-4}$ | −0.445 × 10$^{-4}$ | −0.325 × 10$^{-4}$ | −0.908 × 10$^{-4}$ | 0.212 × 10$^{-4}$ |
| 0.5 $y_{max}$ | −0.650 × 10$^{-4}$ | −0.937 × 10$^{-4}$ | −0.623 × 10$^{-4}$ | −0.136 × 10$^{-3}$ | 0.198 × 10$^{-4}$ |
| 0.6 $y_{max}$ | −0.114 × 10$^{-3}$ | −0.176 × 10$^{-3}$ | −0.105 × 10$^{-3}$ | −0.155 × 10$^{-3}$ | −0.310 × 10$^{-4}$ |
| 0.7 $y_{max}$ | −0.185 × 10$^{-3}$ | −0.307 × 10$^{-3}$ | −0.164 × 10$^{-3}$ | −0.100 × 10$^{-3}$ | −0.189 × 10$^{-3}$ |
| 0.8 $y_{max}$ | −0.280 × 10$^{-3}$ | −0.503 × 10$^{-3}$ | −0.241 × 10$^{-3}$ | 0.120 × 10$^{-3}$ | −0.521 × 10$^{-3}$ |
| 0.9 $y_{max}$ | −0.405 × 10$^{-3}$ | −0.783 × 10$^{-3}$ | −0.344 × 10$^{-3}$ | 0.689 × 10$^{-3}$ | −0.113 × 10$^{-2}$ |

TABLE 3-continued

[Example 3]

| | $A_{FR}$ | | | $A_{RE}$ | |
|---|---|---|---|---|---|
| y | $r_1$ | $r_2$ | $r_4$ | $r_5$ | $r_6$ |
| 1.0 $y_{max}$ | $-0.583 \times 10^{-3}$ | $-0.116 \times 10^{-2}$ | $-0.485 \times 10^{-3}$ | $0.194 \times 10^{-2}$ | $-0.235 \times 10^{-2}$ |

TABLE 4

| | $\Delta T_{12}/f_T$ | $f_2/f_W$ | $\phi_{G2}$ |
|---|---|---|---|
| Example 1 | 0.219 | 0.586 | 0.043 |
| Example 2 | 0.154 | 0.630 | 0.040 |
| Example 3 | 0.200 | 0.631 | 0.040 |
| Example 4 | 0.219 | 0.586 | 0.043 |

What is claimed is:

1. A compact-size zoom lens system comprising:
a plurality of lens units for changing a focal length of the zoom lens system by shifting at least one lens unit on an optical axis during a zooming operation;
a ray restrictor, being placed at the object side of all of the lens units and being able to shift on the optical axis at a speed different from that of the most object side lens unit, the ray restrictor having an opening for passing through light rays, except for undesirable off-axial light rays for the lens units; and
an aperture stop arranged within the lens units of the lens system for controlling the amount of light that is transmitted to the film.

2. A compact-size zoom lens system as claimed in claim 1, wherein the ray restrictor shifts from the image side to the object side during the zooming operation from a shorter focal length to a longer focal length.

3. A compact-size zoom lens system as claimed in claim 2, wherein the zoom lens system comprises, from the object side to the image side, a first positive lens unit and a second negative lens unit, both of which shift on the optical axis from the image side to the object side during a zooming operation from a shorter focal length to a longer focal length at speeds different from each other.

4. A compact-size zoom lens system as claimed in claim 3, wherein the ray restrictor shifts with the second negative lens unit in a linked body.

5. A compact-size zoom lens system as claimed in claim 3, wherein an axial distance between the most image side surface of the first positive lens unit to the most object side surface of the second negative lens unit at the longest focal length condition fulfills the following condition:

$$0.1 < \Delta T_{12}/f_T < 0.4,$$

where
$\Delta T_{12}$: the axial distance between the most image side surface of the first lens unit to the most object side surface of the second lens unit, and
$f_T$: the longest focal length of the zoom lens system.

6. A compact-size zoom lens system as claimed in claim 3, wherein the zoom lens system fulfills the following condition:

$$0.40 < f_2/f_W < 0.75,$$

where
$f_2$: focal length of the image side lens element of the first lens unit, and $f_W$: the shortest focal length of the zoom lens.

7. A compact-size zoom lens system as claimed in claim 3, wherein the first positive lens unit includes at least one aspherical surface fulfilling the following condition:
for a height y from the optical axis of the zoom lens system satisfying $y \leq 0.7 y_{MAX}$ where $y_{MAX}$ is the maximum effective radius of the aspherical surface, $$-0.03 < \phi_1 \cdot (N' - N) \cdot d\{x(y) - x_0(y)\}/dy < 0,$$

where
$\phi_1$: refractive power of the first positive lens unit,
$N$: refractive index of the medium at the object side of the aspherical surface,
$N'$: refractive index of the medium at the image side of the aspherical surface,
$x(y)$: axial deviation of the aspherical surface from its vertex at the height y, which is give by $$x(y) = (r/\epsilon)\{1 - (1 - \epsilon(y^2/r^2))^{\frac{1}{2}}\} + \Sigma A_i y^i$$

(summation $\Sigma$ made for $i \geq 2$)
$x_0(y)$: axial deviation of the reference spherical surface of the aspherical surface from its vertex at the height y, which is given by $$x_0(y) = \bar{r}\{1 - (1 - y^2/\bar{r}^2)^{\frac{1}{2}}\}$$

r: radius of curvature of the aspherical surface at the vertex,
$\epsilon$: quadric surface parameter,
$A_i$: aspherical coefficient of the i-th order, and
$\bar{r}$: radius of curvature at the vertex, which is given by $$1/\bar{r} = 1/r + 2A_2.$$

8. A compact-size zoom lens system as claimed in claim 7, wherein all of the aspherical surfaces included in the first positive lens unit fulfill the following condition:
for a height y from the optical axis of the zoom lens system satisfying $y \leq 0.7 y_{MAX}$ where $y_{MAX}$ is the maximum effective radius of the aspherical surface, $$-0.02 < \phi_1 \cdot (N' - N) \cdot d\{x(y) - x_0(y)\}/dy < 0.01.$$

9. A compact-size zoom lens system as claimed in claim 3, wherein the second negative lens unit includes at least one aspherical surface fulfilling the following condition:
for a height y from the optical axis of the zoom lens system satisfying $0.8 y_{MAX} < y < y_{MAX}$ where $y_{MAX}$ is the maximum effective radius of the aspherical surface, $$-0.10 < \phi_2 \cdot (N' - N) \cdot d\{x(y) - x_0(y)\}/dy < 0,$$

where
$\phi_2$: refractive power of the second lens unit,

N: refractive index of the medium at the object side of the aspherical surface,

N': refractive index of the medium at the image side of the aspherical surface, x(y): axial deviation of the aspherical surface from its vertex at the height y, which is give by $$x(y) = (r/\epsilon)\{1 - (1 - \epsilon(y^2/r^2))^{\frac{1}{2}}\} + \Sigma A_i y^i$$

(summation $\Sigma$ made for $i \geq 2$)

$x_0(y)$: axial deviation of the reference spherical surface of the aspherical surface from its vertex at the height y, which is given by $$x_0(y) = \tilde{r}\{1 - (1 - y^2/\tilde{r}^2)^{\frac{1}{2}}\}$$

r: radius of curvature of the aspherical surface at the vertex, $\epsilon$: quadric surface parameter, $A_i$: aspherical coefficient of the i-th order, and $\tilde{r}$: radius of curvature at the vertex, which is given by $$1/\tilde{r} = 1/r + 2A_2.$$

10. A compact-size zoom lens system as claimed in claim 9, wherein all of the aspherical surfaces included in the second negative lens unit fulfill the following condition:

for a height y from the optical axis of the zoom lens system satisfying $y \leq 0.8 y_{MAX}$ where $y_{MAX}$ is the maximum effective radius of the aspherical surface, $$-0.05 < \phi_2 \cdot (N' - N) \cdot d\{x(y) - x_0(y)\}/dy < 0.02.$$

11. A compact-size zoom lens system as claimed in claim 3, wherein the second negative lens unit consists of a negative lens element.

12. A compact-size zoom lens system as claimed in claim 11, wherein the first positive lens unit consists of two lens elements.

13. A compact-size zoom lens system as claimed in claim 12, wherein the first positive lens unit consists of, from the object side to the image side, a negative meniscus lens element convex at the image side and a positive lens element whose image side surface has a stronger refractive power than the object side surface.

14. A compact-size zoom lens system as claimed in claim 13, wherein the both surfaces of the negative meniscus lens element constituting the first positive lens unit are aspherical.

15. A compact-size zoom lens system as claimed in claim 13, wherein the both surfaces of the negative lens element constituting the second negative lens unit are aspherical.

16. A compact-size zoom lens system as claimed in claim 13, wherein the image side surface of the positive lens element constituting the first positive lens unit is aspherical.

17. A compact-size zoom lens system as claimed in claim 3, wherein the diameter of the opening of the ray restrictor is less than 1.2 times that of the diameter of an entrance pupil at either the shortest focal length condition or the longest focal length condition of the zoom lens system.

18. A compact-size zoom lens system as claimed in claim 17, wherein the diameter of the opening is less than 1.05 times that of the diameter of the entrance pupil at either the shortest focal length condition or the longest focal length condition of the zoom lens system.

19. A compact-size zoom lens system as claimed in claim 17, wherein the size of the diameter of the opening is fixed during a zooming operation.

20. A compact-size zoom lens system comprising:

a plurality of lens units for changing a focal length of the zoom lens system by shifting at least one lens unit on an optical axis during a zooming operation;

a ray restrictor, being placed at the object side of all of the lens units and being able to shift on the optical axis, the ray restrictor having an opening, variable according to the zooming operation, for passing through light rays, except for undesirable off-axial light rays for the lens units; and an aperture stop arranged inside of the lens units for controlling the amount of light that is transmitted to the film.

21. A compact-size zoom lens system as claimed in claim 20, wherein the diameter of the aperture becomes small with a zooming operation from a shorter focal length to a longer focal length.

22. A compact-size zoom lens system as claimed in claim 21, wherein the zoom lens system comprises, from the object side to the image side, a first positive lens unit and a second negative lens unit, both of which shift on the optical axis from the image side to the object side during a zooming operation from a shorter focal length to a longer focal length at speeds different from each other.

23. A compact-size zoom lens system as claimed in claim 22, wherein the ray restrictor shifts on the optical axis with the first positive lens unit in a linked body during the zooming operation.

24. A compact-size zoom lens system comprising:

a zoom lens having lens elements for changing a focal length of the zoom lens system by shifting the lens elements on an optical axis during a zooming operation; and a ray restrictor, being placed at the most object side of an optical system constituting the zoom lens system and being able to shift on the optical axis at a speed different from that of the most object side lens element of the zoom lens system, the ray restrictor having an opening for restricting undesirable light rays incident on the optical system, wherein the ray restrictor shifts from the image side to the object side during a zooming operation from a shorter focal length to a longer focal length.

25. A compact-size zoom lens system as claimed in claim 24, wherein the zoom lens system comprises, from the object side to the image side, a first positive lens element and a second negative lens element, both of which shift on the optical axis from the image side to the object side during a zooming operation from a shorter focal length to a longer focal length at speeds different from each other.

26. a compact-size zoom lens system as claimed in claim 24, further including an aperture stop arranged inside of the zoom lens unit.

27. A compact-size zoom lens system as claimed in claim 25, wherein the ray restrictor shifts with the second negative lens element in a linked body.

* * * * *

UNITED STATES PATENT AND TRADEMARK OFFICE
CERTIFICATE OF CORRECTION

PATENT NO. : 6,153,777
DATED : November 28, 2000
INVENTOR(S) : Jordan et al.

It is certified that error appears in the above-identified patent and that said Letters Patent is hereby corrected as shown below:

Column 1,
Line 57, please delete [M ülhaupt] and insert -- Mülhaupt --.

Column 3,
Line 23, please delete [M₁] and insert -- $M^1$ --.

Column 4,
Line 9, please delete [can prepared] and insert -- can be prepared --.
Line 41, please delete [tetrahydofuran] and insert -- tetrahydrofuran --.

Column 5,
Line 58, please delete [M₁] and insert -- $M^1$ --.

Column 6,
Line 20, delete

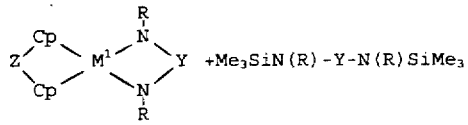

and insert

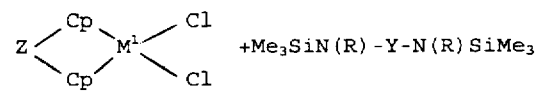

--.

UNITED STATES PATENT AND TRADEMARK OFFICE
CERTIFICATE OF CORRECTION

PATENT NO. : 6,153,777
DATED : November 28, 2000
INVENTOR(S) : Jordan et al.

It is certified that error appears in the above-identified patent and that said Letters Patent is hereby corrected as shown below:

Column 9,
Line 41, delete [⊕] and insert -- β --.

Column 12,
Line 1, delete [with with] and insert -- with --.

Signed and Sealed this

Twenty-seventh Day of November, 2001

*Attest:*

*Attesting Officer*

NICHOLAS P. GODICI
*Acting Director of the United States Patent and Trademark Office*